United States Patent
Romestant et al.

(10) Patent No.: US 11,678,096 B2
(45) Date of Patent: Jun. 13, 2023

(54) SUSPENSION SYSTEM LOCKING MECHANISM

(71) Applicant: HARMAN INTERNATIONAL INDUSTRIES, INCORPORATED, Stamford, CT (US)

(72) Inventors: Lawrence Romestant, Northridge, CA (US); Jacques Spillmann, Los Angeles, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 332 days.

(21) Appl. No.: 17/146,755

(22) Filed: Jan. 12, 2021

(65) Prior Publication Data
US 2021/0227308 A1    Jul. 22, 2021

Related U.S. Application Data

(60) Provisional application No. 62/962,456, filed on Jan. 17, 2020.

(51) Int. Cl.
*H04R 1/02* (2006.01)
*F16M 13/02* (2006.01)
*H04R 1/40* (2006.01)

(52) U.S. Cl.
CPC ............ *H04R 1/026* (2013.01); *F16M 13/02* (2013.01); *H04R 1/025* (2013.01); *H04R 1/403* (2013.01); *F16M 2200/02* (2013.01)

(58) Field of Classification Search
CPC ........ H04R 1/026; H04R 1/025; H04R 1/323; H04R 1/403; F16M 13/02
USPC .............................................. 381/87, 89, 332
See application file for complete search history.

(56) References Cited

U.S. PATENT DOCUMENTS

| 9,584,887 | B2* | 2/2017 | Spillmann | H04R 1/323 |
| 9,992,565 | B2* | 6/2018 | Spillmann | H04R 1/403 |
| 10,375,468 | B2* | 8/2019 | Spillmann | H04R 1/323 |
| 11,245,980 | B2* | 2/2022 | Korell | H04R 1/02 |
| 2022/0321982 | A1* | 10/2022 | Kirsch | H04R 1/323 |

OTHER PUBLICATIONS

Datasheet, 1100-LFC Low Frequency Control Element, Meyer Sound Laboratories, Inc., 2019, 4 pages.
KS28 Product Information version 2.0, L-Acoustics, Jan. 18, 2018, 12 pages.

* cited by examiner

*Primary Examiner* — Todd M Epps
(74) *Attorney, Agent, or Firm* — Brooks Kushman P.C.

(57) ABSTRACT

A suspension system for a speaker line array is provided with a base to mount to a first speaker cabinet. A rail extends transversely from the base. A bar is mounted relative to the rail between a stowed position and an extended position, wherein the bar is biased away from a central portion of the base to the extended position to contact another speaker or a support. A locking mechanism is driven by a transmission to lock the bar in the stowed position.

20 Claims, 11 Drawing Sheets

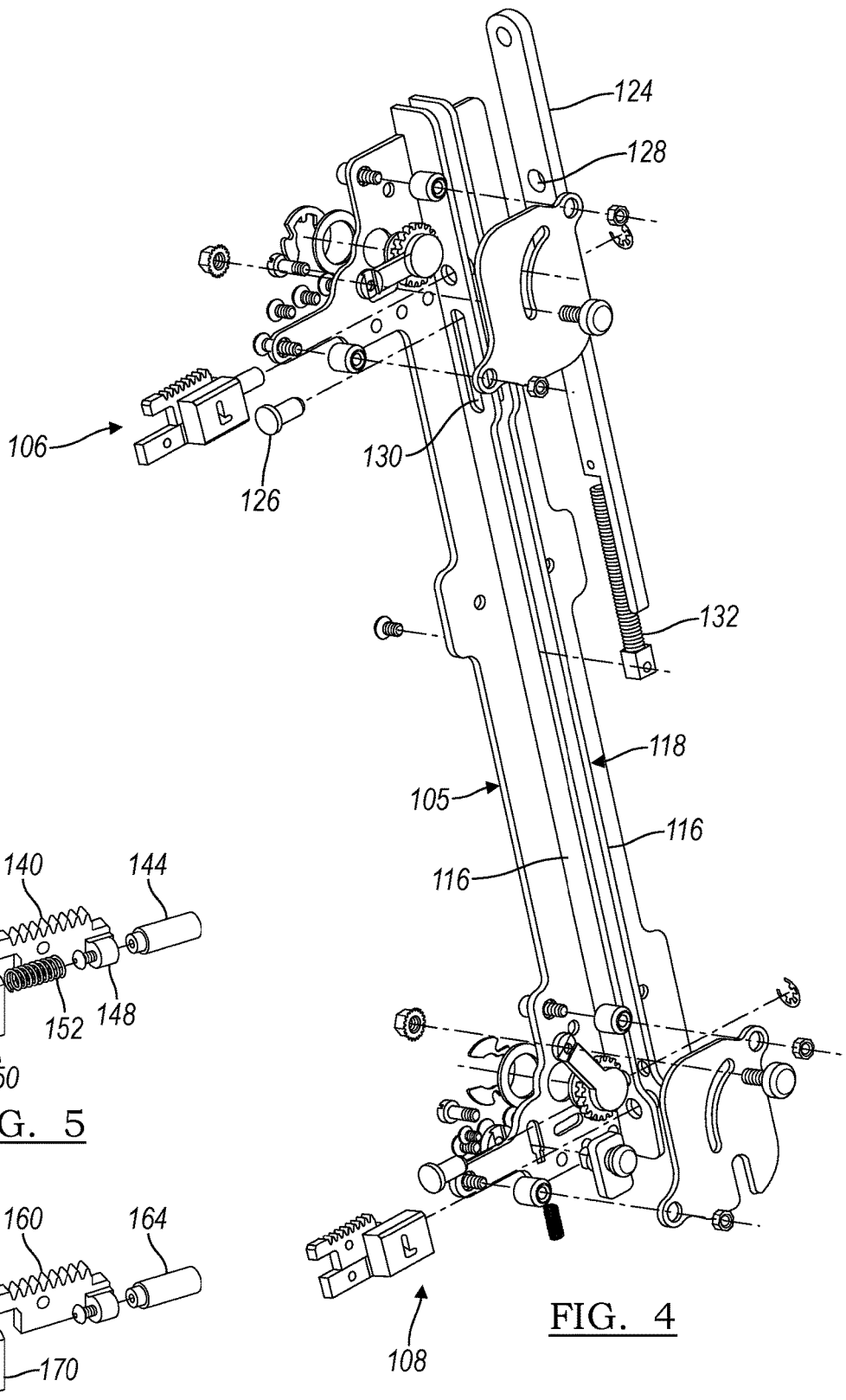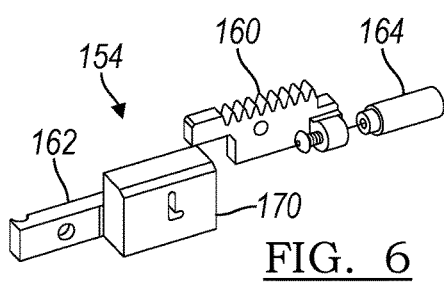

SUSPENSION SYSTEM LOCKING MECHANISM

CROSS-REFERENCE TO RELATED APPLICATIONS

This application claims the benefit of U.S. provisional application Ser. No. 62/962,456 filed Jan. 17, 2020, the disclosure of which is hereby incorporated in its entirety by reference herein.

TECHNICAL FIELD

One or more embodiments relate to a suspension system locking mechanism for a line array of speakers.

BACKGROUND

Existing systems for connecting adjacent speakers of a vertical line array using removable fasteners are known. U.S. Pat. Nos. 10,375,468 and 9,584,887, both to Spillmann et al. disclose examples of such systems.

SUMMARY

In one embodiment, a suspension system is provided with a frame with a base and a pair of rails extending transversely from the base and laterally spaced apart from each other to define a channel extending longitudinally along a face of the base. Each rail has a slot formed through and extending longitudinally along an intermediate portion of the rail and aligned with the other slot. A bar having an elongate shape is disposed within the channel. The bar includes a pin extending transversely through and received by each slot, and the bar is mounted for translation within the channel between a stowed position and an extended position defined the slot length. The bar is spring biased away from a central portion of the frame to the extended position for engaging a second suspension system of a vertically adjacent speaker. An upper locking mechanism is coupled to an upper portion of the frame, and includes a first pinion gear pivotally connected to the frame about a first pivot axis and a first lever arm extending radially outward from a face of the first pinion gear and adapted for manual adjustment. A first rack is coupled to the first pinion gear and mounted for lateral translation relative to the frame in response to the manual adjustment of the first lever arm. A first pin extends from the first rack to extend through a central aperture formed through the bar to lock the bar in a stowed position. A lower locking mechanism is coupled to a lower portion of the frame, and includes a second pinion gear pivotally connected to the frame about a second pivot axis and a second lever arm extending radially outward from a face of the second pinion gear and adapted for manual adjustment. A second rack is coupled to the second pinion gear and mounted for lateral translation relative to the frame in response to the manual adjustment of the second lever arm. A second pin extends from the second rack and is adapted to extend through a distal aperture formed through a suspension system bar of a vertically adjacent speaker, for supporting the vertically adjacent speaker. A lock button is mounted for longitudinal translation relative to the frame and adapted to engage the second rack to lock the second pin in engagement with the suspension system bar of the vertically adjacent speaker.

In another embodiment, a suspension system for a speaker line array is provided with a base to mount to a first speaker cabinet. A rail extends transversely from the base. A bar is mounted relative to the rail between a stowed position and an extended position, wherein the bar is biased away from a central portion of the base to the extended position to contact another speaker or a support. A locking mechanism is driven by a transmission to lock the bar in the stowed position.

In yet another embodiment, a suspension system is provided with a base to mount to a speaker cabinet. A pair of rails extend transversely from the base and are laterally spaced apart from each other to define a channel. A first bar is mounted relative to the pair of rails between a stowed position and an extended position, wherein the first bar is biased away from a central portion of the base to the extended position. A first pinion gear is pivotally connected to an upper portion of the base about a first pivot axis. A first rack is coupled to the base and is mounted for translation in response to pivotal motion of the first pinion gear. A first pin extends from the first rack to extend through a central aperture formed through the first bar to lock the first bar in the stowed position. A second pinion gear pivotally connected to a lower portion of the base about a second pivot axis. A second rack is mounted for translation in response to pivotal motion of the second pinion gear. A second pin extends from the second rack to extend through a distal aperture formed through a suspension system bar of a lower vertically adjacent speaker.

In still yet another embodiment, a method for disassembling a line array of speaker assemblies is provided. A suspension system of an uppermost speaker assembly of at least two stacked speaker assemblies is disconnected from an upper support. A bar of the suspension system of the uppermost speaker assembly is translated downward from an extended position to lock the bar in a stowed position. A lock button of a lower locking mechanism of the uppermost speaker assembly is translated. A lever arm of the lower locking mechanism of the uppermost speaker assembly is pivoted about a pivot axis to unlock the suspension system of the uppermost speaker assembly from the suspension system of a lower speaker assembly. The uppermost speaker assembly is removed from the lower speaker assembly.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 4 is a front partially exploded perspective view of the frame of FIG. 2.

FIG. 5 is an enlarged exploded view of an upper rack assembly of the upper locking mechanism of FIG. 4.

FIG. 6 is an enlarged exploded view of a lower rack assembly of the lower locking mechanism of FIG. 4.

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
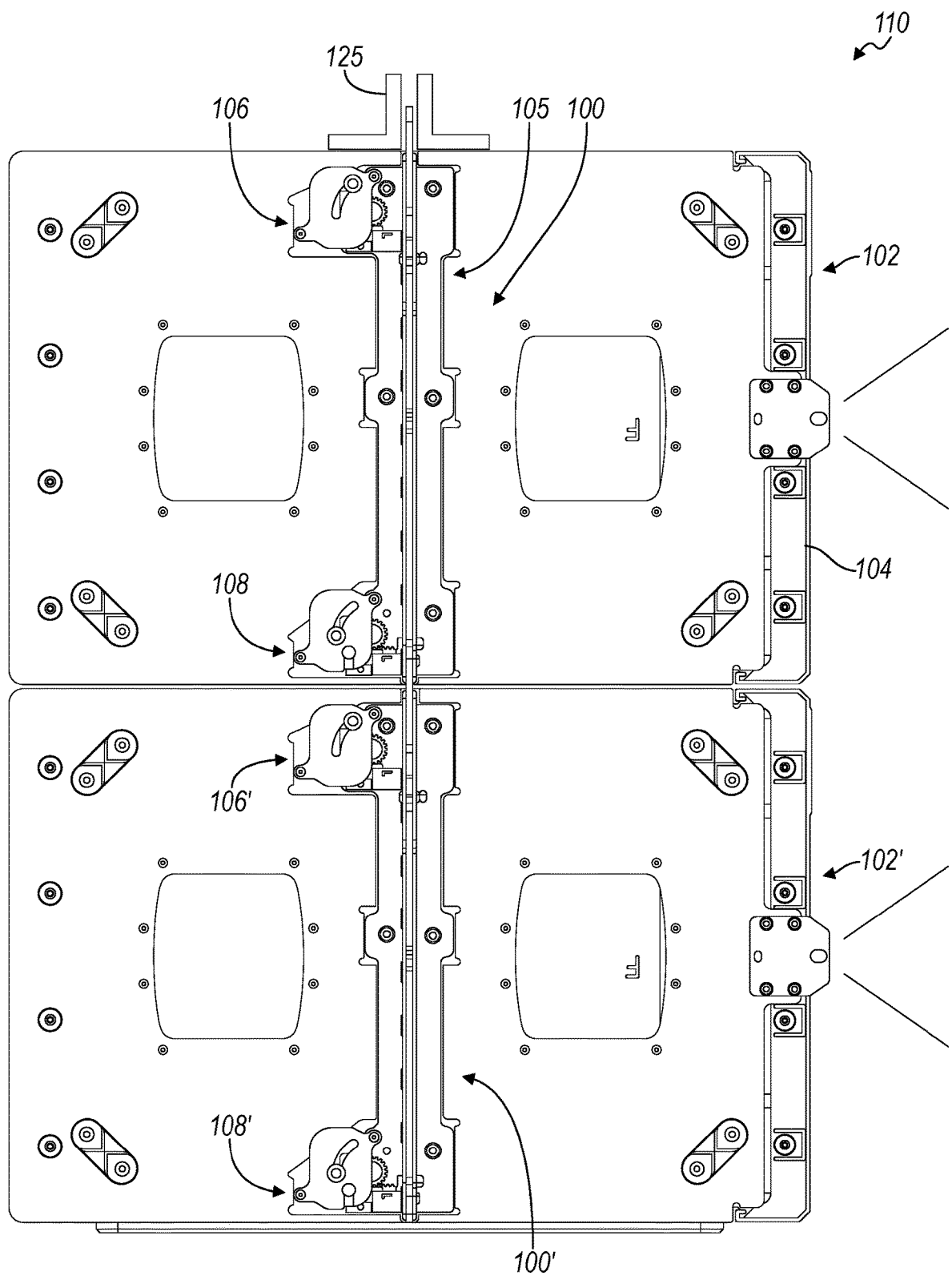
FIG. 1 is a left side view of a line array of speaker assemblies illustrated without covers, each speaker assembly having a suspension system according to one or more embodiments.

With reference to FIG. 1, a suspension system is illustrated in accordance with one or more embodiments and generally represented by numeral 100. A speaker assembly 102 includes a speaker cabinet 104 and the suspension system 100. Each suspension system 100 includes a left frame 105 and a right frame (not shown) that are mounted to opposing lateral sides of the speaker cabinet 104. The frames are generally mirror images of each other and collectively connect the speaker assembly 102 to vertically adjacent speaker assemblies. The left frame 105 includes an upper locking mechanism 106 and a lower locking mechanism 108. FIG. 1 illustrates the lower locking mechanism 108 connected to the suspension system 100' of a lower speaker assembly 102' without removable fasteners to form a line array 110. The line array 110 may be connected to a support, such as an array frame and suspended from an upper structure (not shown).

Figures 2, 3:
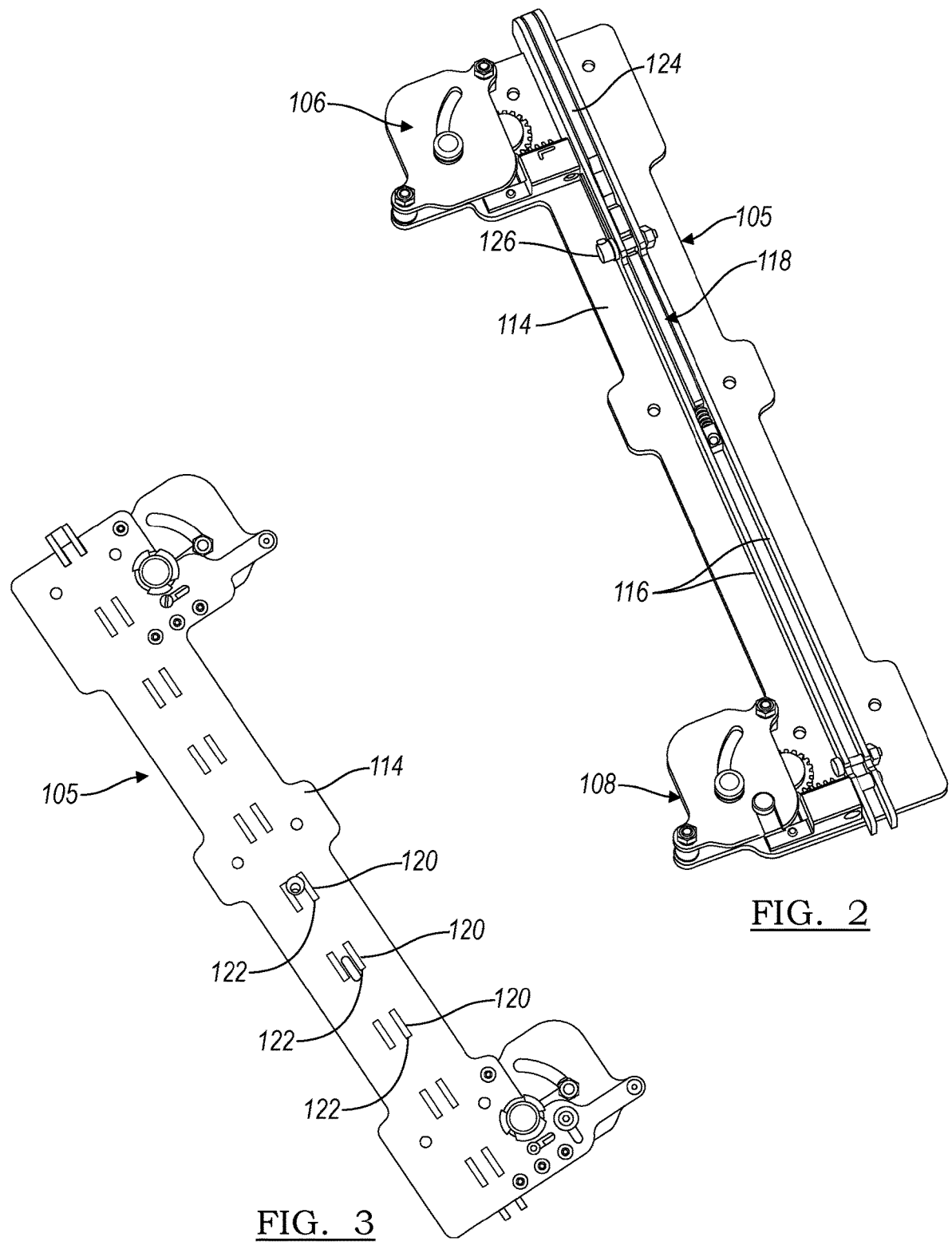
FIG. 2 is a front perspective view of a frame of the suspension system of FIG. 1, illustrating an upper locking mechanism and a lower locking mechanism.
FIG. 3 is a rear perspective view of the frame of FIG. 2.

Referring to FIG. 2, the frame 105 of the suspension system 100 supports the upper and lower locking mechanisms 106, 108. The frame 105 includes a base 114 that is mounted to a side surface of the speaker cabinet 104 (FIG. 1). The frame 105 also includes a pair of rails 116 that extend transversely from the base 114. The rails 116 are laterally spaced apart from each other to define a channel 118 that extends longitudinally along the base 114.

Figure 11:
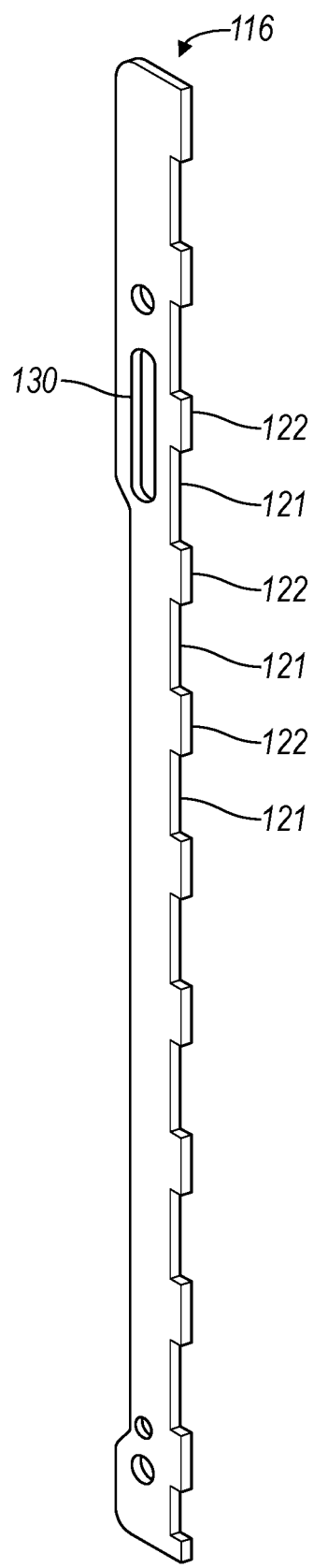
FIG. 11 is a rear perspective view of a rail of the frame of FIG. 2.

With reference to FIGS. 3 and 11, the frame 105 includes features for locating the rails 116 relative to the base 114 to define the channel 118, according to one or more embodiments. The frame 105 includes a series of parallel slots 120 that are formed through the base 114 and longitudinally spaced apart from each other. Each rail 116 is formed in an elongate shape with a longitudinal edge 121 and a series of projections 122 that extend from the edge 121 to engage the base 114 within the slots 120. The rails 116 are fixed, e.g., welded, to the base 114. In one embodiment the slots 120 and projections are formed in the frame 105 by laser cutting.

Figure 12:
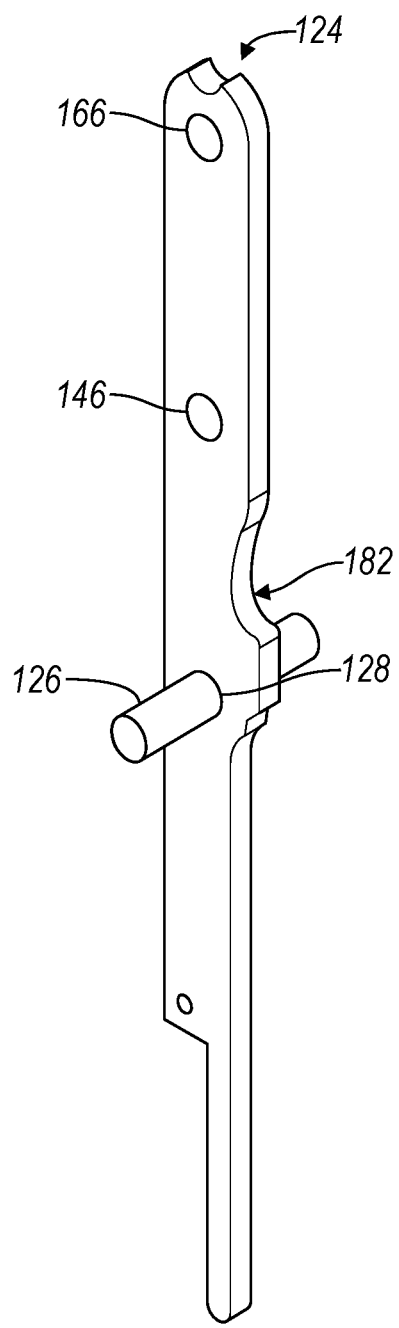
FIG. 12 is a front perspective view of a bar of the frame of FIG. 2.
Figure 13:
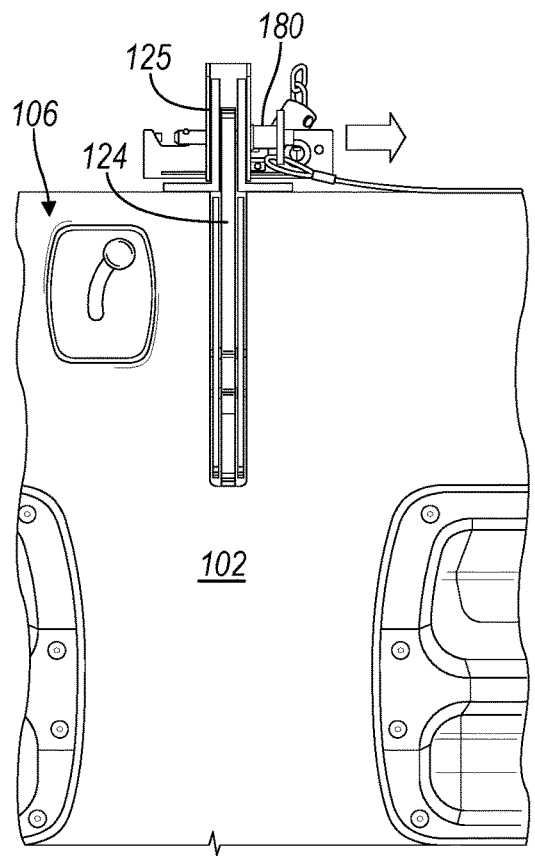
FIG. 13 illustrates a first step of a method for installing the line array of FIG. 1, according to one or more embodiments.
Figure 14:
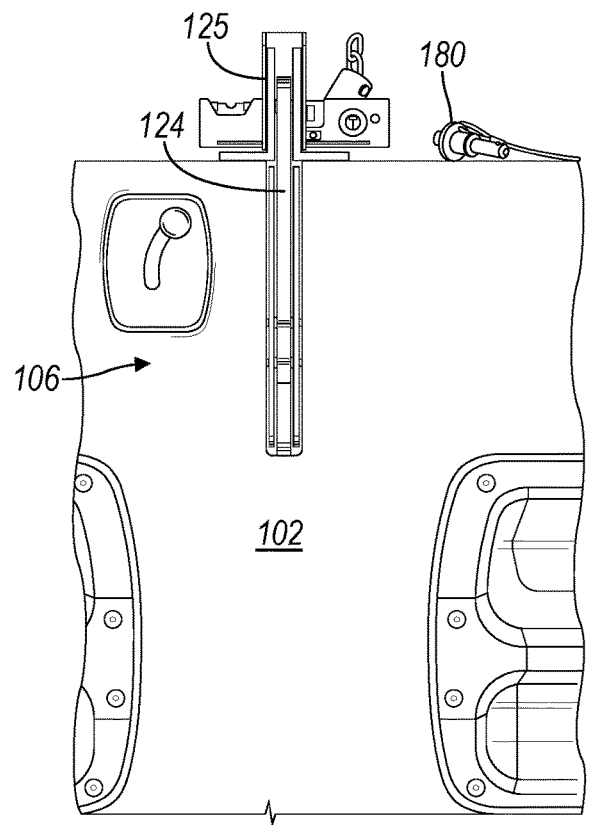
FIG. 14 illustrates disconnecting the suspension system from an upper bracket according to a second step of the method of FIG. 13.

Referring to FIGS. 2, 3, and 12, the suspension system 100 includes a bar 124 for connecting the speaker assembly 102 to a bracket 125 or a vertically adjacent speaker assembly 102 (shown in FIG. 1.) The bar 124 is formed in an elongate shape and is disposed within the channel 118. The suspension system 100 includes a pin 126 that extends through a central aperture 128 (shown in FIG. 12) formed through the bar 124.

Figure 7:
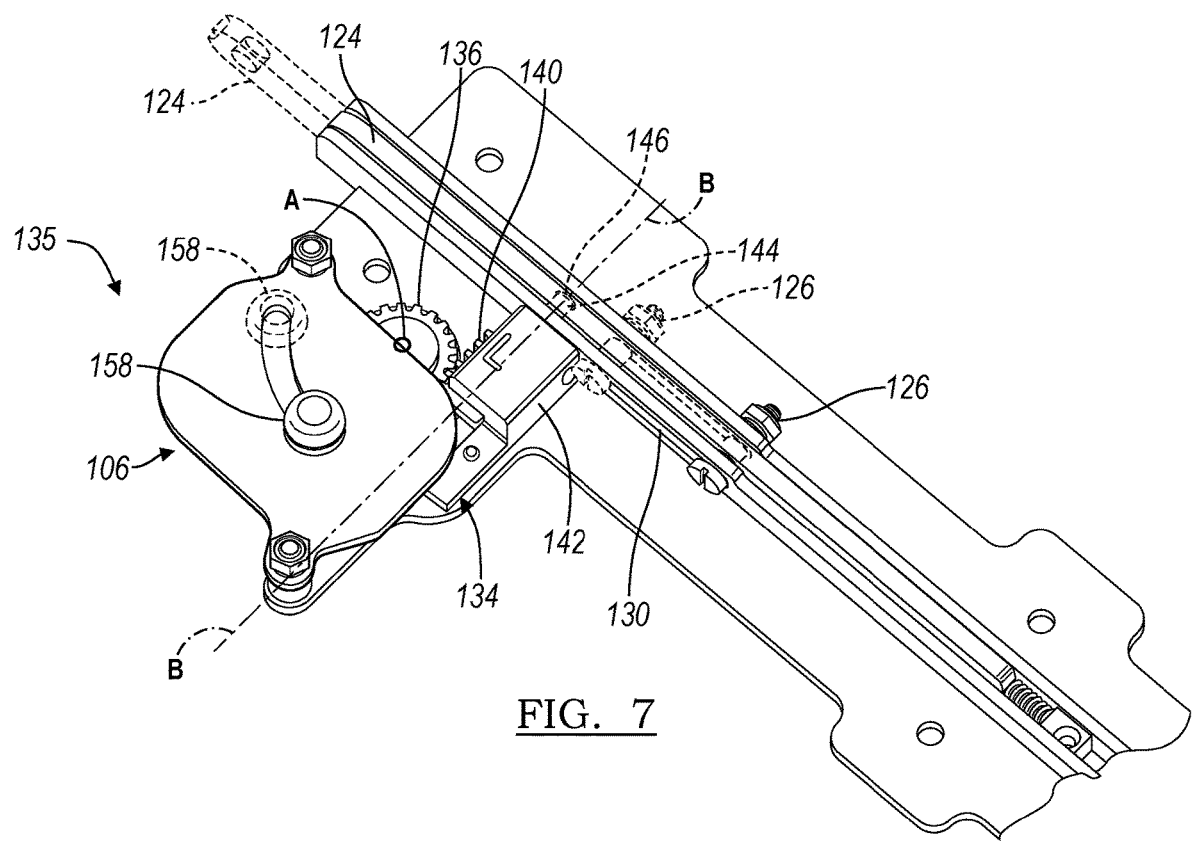
FIG. 7 is a front perspective view of the upper locking mechanism of FIG. 2.

With reference to FIGS. 4 and 7, the bar 124 is mounted for translation within the channel 118. Each rail 116 includes a slot 130 formed through that extends longitudinally along an intermediate portion of the rail 116 and is aligned with the slot 130 of the other rail 116 for receiving the pin 126 of the bar 124 and retaining the bar 124 within the channel 118. The bar 124 is mounted for translation within the channel 118 between a stowed position (shown in solid line in FIG. 7) and an extended position (shown in dashed line in FIG. 7) at a distance defined by the length of the slot 130. The suspension system 100 includes a compression spring 132 that is coupled to a central portion of the frame to bias the bar 124 to the extended position for engaging a suspension system of a vertically adjacent speaker, or a bracket 125 (shown in FIG. 1).

Figure 8:
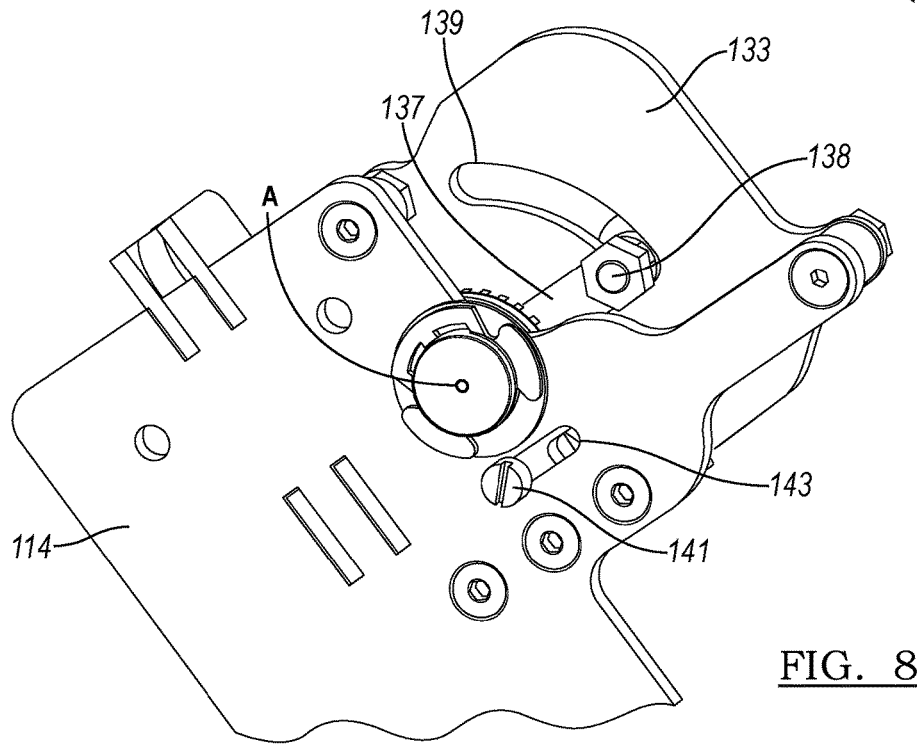
FIG. 8 is a rear perspective view of the upper locking mechanism of FIG. 2.

Referring to FIGS. 7 and 8, the upper locking mechanism 106 is coupled to an upper portion of the frame 105. The upper locking mechanism 106 includes a plate 133 that is mounted to an upper portion of the base 114. The upper locking mechanism 106 includes a transmission 135 with an upper rack assembly 134, a pinion gear 136, and a lever arm 137 that are coupled between the base 114 and the plate 133. The pinion gear 136 is pivotally connected to the frame 105 about a pivot axis A-A. The lever arm 137 extends radially outward from a face of the pinion gear 136 between the base 114 and the plate 133. A handle 138 extends transversely from lever arm 137 and through an arcuate slot 139 formed through the plate 133. A user may manually pivot the lever arm 137 about Axis A by sliding the handle 138 along the arcuate slot 139.

The upper locking mechanism 106 may be adjusted to lock the bar 124 in the stowed position. The upper rack assembly 134 includes a rack 140 that engages the pinion gear 136 and a post 141 that extends transversely from the rack 140 through a slot 143 formed through the base 114. The rack 140 is disposed between the base 114 and the plate 133 and is mounted for lateral translation upon a guide 142 at a distance defined by the slot 143 in response to the manual adjustment of the lever arm 137. The upper rack assembly 134 also includes a pin 144 that extends from the rack 140 along lateral Axis B-B to extend through a lower aperture 146 formed through the bar 124 to lock the bar 124 in the stowed position (shown in solid line).

With reference back to FIG. 5, the upper rack assembly 134 of the upper locking mechanism 106 is spring biased to engage and lock the bar 124 in the stowed position, according to one or more embodiments. The upper rack assembly 134 includes a tab 148 that extends transversely from the rack 140. The pin 144 is secured to a first side of the tab 148 to extend from the rack 140 toward the bar 124. An endstop 150 is mounted to the guide 142. A compression spring 152 is disposed between the endstop 150 and a second side of the tab 148 to bias the pin 144 toward the bar 124 to extend through the lower aperture 146. The endstop 150 may include a bore for receiving and substantially enclosing the spring 152.

Referring to FIGS. 5, 7, and 8, a user may manually release, or unlock, the upper locking mechanism 106. A user may manually pivot the lever arm 137 clockwise about Axis A (as viewed in FIG. 7) to translate the rack 140 away from the bar 124, compress the spring 152, and disengage the pin 144 from the lower aperture 146. Once the pin 144 disengages the lower aperture 146, the compression spring 132 retained within the channel 118 biases the bar 124 upward to the extended position, as shown in dashed line.

Figure 9:
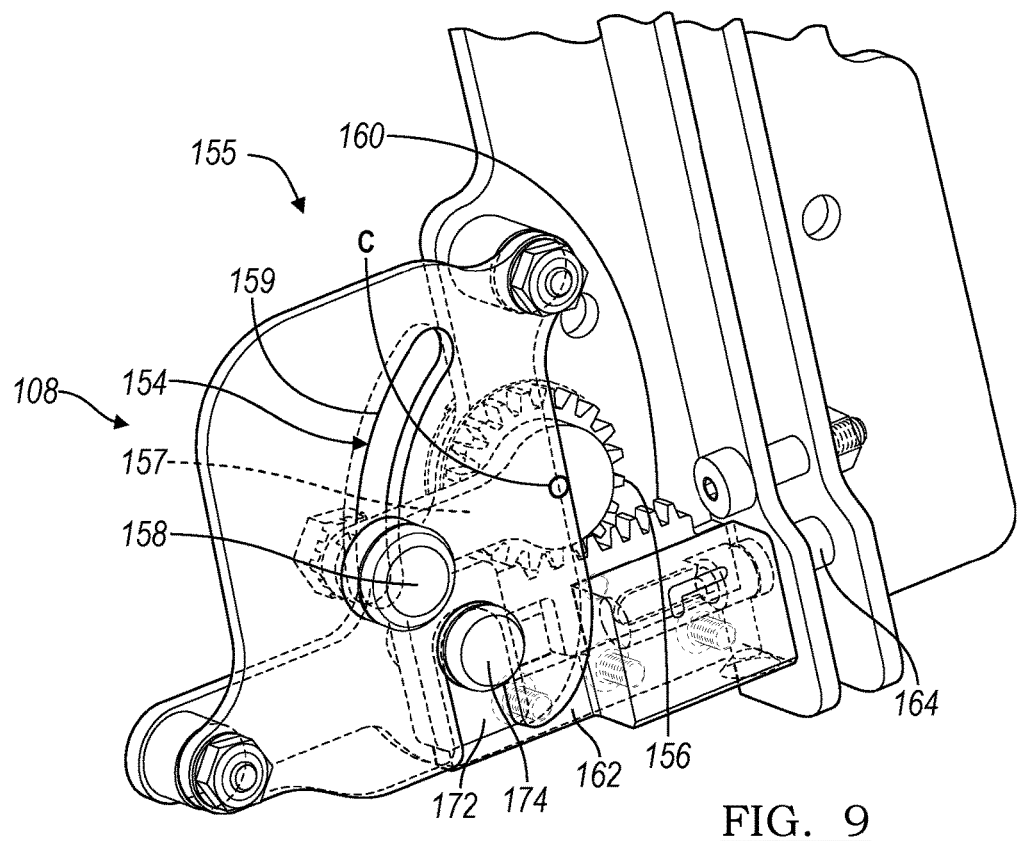
FIG. 9 is a front perspective view of the lower locking mechanism of FIG. 2.
Figure 10:
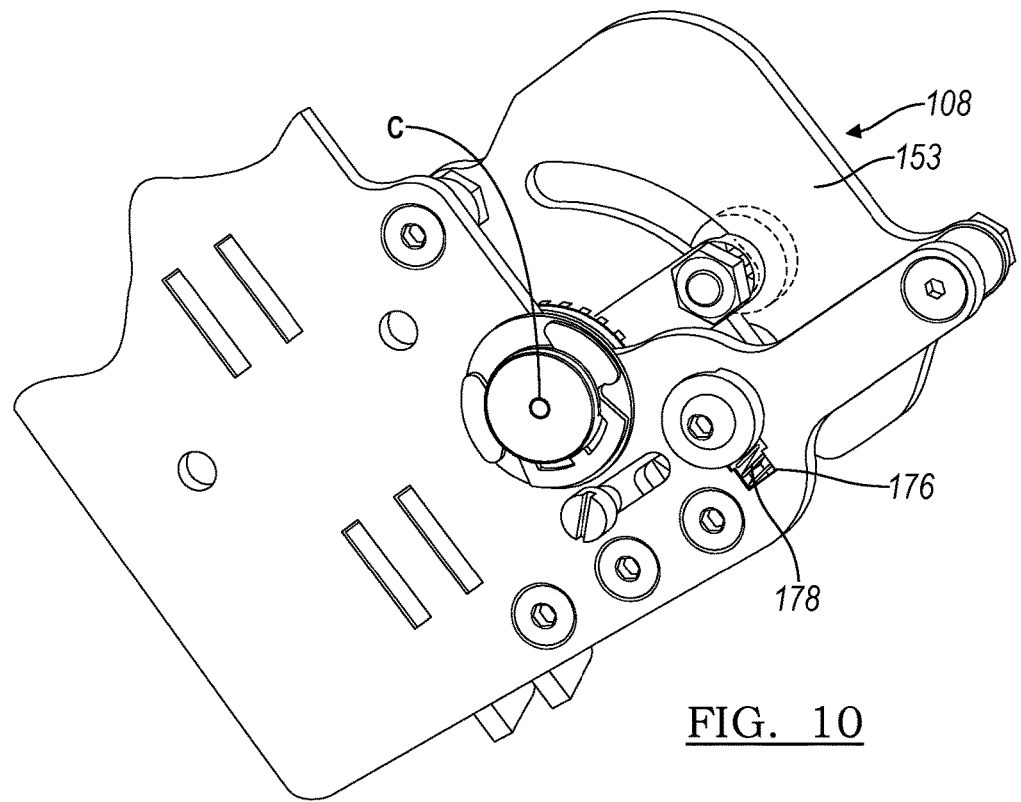
FIG. 10 is a rear perspective view of the lower locking mechanism of FIG. 2.

With reference to FIGS. 9 and 10, the lower locking mechanism 108 is coupled to a lower portion of the frame 105. The lower locking mechanism 108 includes a plate 153 that is mounted to a lower portion of the base 114. The lower locking mechanism 108 includes a transmission 155 with a lower rack assembly 154, a pinion gear 156, and a lever arm 157 that are coupled between the base 114 and the plate 153. The pinion gear 156 is pivotally connected to the frame 105 about a pivot axis C-C. The lever arm 157 extends radially outward from a face of the pinion gear 156 between the base 114 and the plate 153. A handle 158 extends transversely from lever arm 157 and through an arcuate slot 159 formed through the plate 153. A user may manually pivot the lever arm 157 about Axis C by sliding the handle 158 along the arcuate slot 159.

Referring to FIGS. 6, 9, and 10, the lower locking mechanism 108 may be adjusted to lock the suspension system 100 to the suspension system 100' of a vertically adjacent speaker assembly 102' to form a line array. The lower rack assembly 154 includes a rack 160 that engages the pinion gear 156. The rack 160 is disposed between the base 114 and the plate 153 and is mounted for lateral translation upon a guide 162 in response to the manual adjustment of the lever arm 157. The lower locking mechanism 108 also includes a pin 164 that extends from the rack 160 to extend through an upper aperture 166' formed through the distal end of a bar 124' of a lower speaker assembly 102' in an extended position, for supporting the lower speaker assembly 102'.

The lower locking mechanism 108 may be locked in engagement with the bar 124' of a lower speaker assembly 102', according to one or more embodiments. The lower rack assembly 154 includes a tab 168 that extends transversely from the rack 160. The pin 164 is secured to a first side of the tab 168 to extend from the rack 160 toward the bar 124'. The lower rack assembly 154 also includes an endstop 170 that is mounted to the guide 162.

The lower locking mechanism 108 also includes a lock button 172 that is mounted for longitudinal translation relative to the base 114. The lock button 172 engages a rearward side of the rack 160 to lock the pin 164 in engagement with the upper aperture 166' of the bar 124' of the lower speaker assembly 102' (FIG. 12). A shaft 174 extends transversely from the lock button 172 and through a longitudinal slot 176 that is formed through the base 114. The lower locking mechanism 108 also includes a spring 178 that is retained within the slot 176 to engage the shaft 174 and bias the lock button 172 upwards to lock the pin 164 in engagement with the bar 124', according to one or more embodiments.

Figure 17:
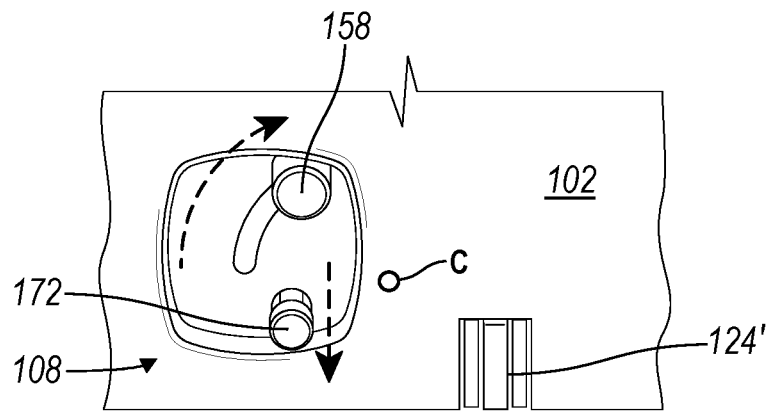
FIG. 17 further illustrates adjusting the lower locking mechanism to the unlocked position according to a fifth step of the method of FIG. 13.
Figure 18:
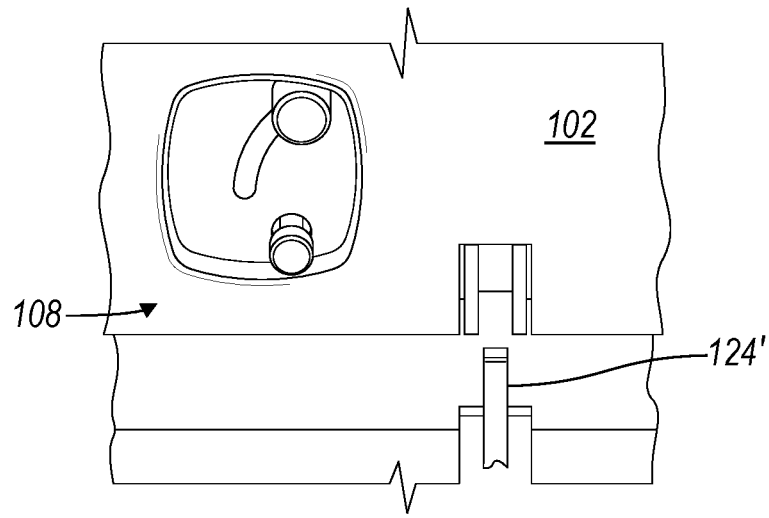
FIG. 18 illustrates lifting an upper speaker assembly according to a sixth step of the method of FIG. 13.
Figure 19:
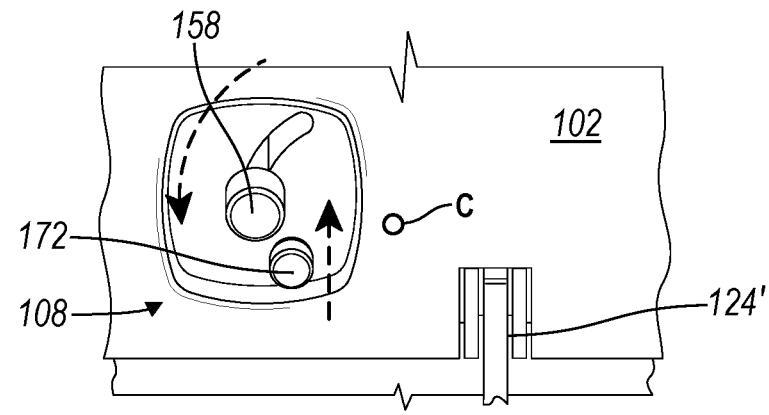
FIG. 19 illustrates reattaching the upper speaker assembly to the lower speaker assembly according to a seventh step of the method of FIG. 13.

FIGS. 13-19 illustrate a method for installing the line array of FIG. 1. FIGS. 13-18 illustrate disassembling an installed line array by unlocking the upper and lower locking mechanisms 106, 108. FIG. 19 illustrates a first step of reassembling the line array. First, with reference to FIGS. 13 and 14, the suspension system 100 is disconnected from the bracket 125 by removing a fastener 180 that extends through the upper aperture 166 (shown in FIG. 12) of the bar 124.

Figure 15:
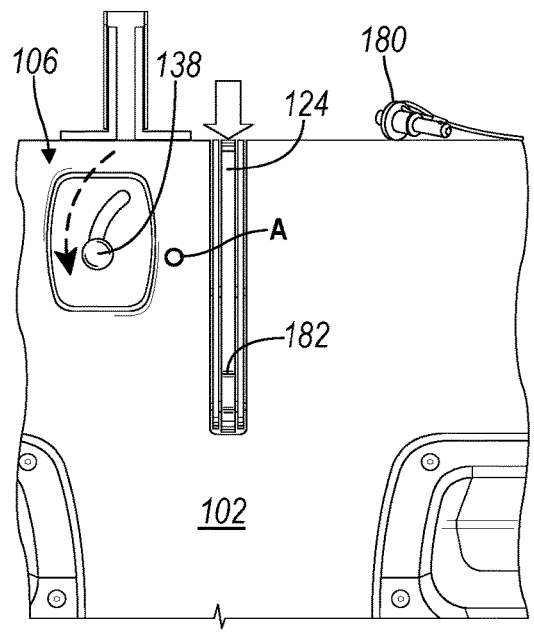
FIG. 15 illustrates adjusting the upper locking mechanism to a locked position according to a third step of the method of FIG. 13.

FIG. 15 illustrates adjusting the upper locking mechanism 106 to the locked position. With reference to FIG. 15, and referring back to FIGS. 5, 7, and 8; the bar 124 is adjusted to the stowed position by manually pressing a top end of the bar 124 downward. As shown in FIG. 12, the bar 124 includes a recess 182 that is formed into an intermediate portion. The bar 124 may also be adjusted to the stowed position by pressing the bar 124 downward within the recess 182. As the user presses the bar 124 downward, the user overcomes the spring force due to compressing the spring 132 (FIG. 4). Once the lower aperture 146 of the bar 124 is aligned with the pin 144, the spring 152 biases the pin 144 to extend into the lower aperture 146, thereby pivoting the lever arm 137 counterclockwise about Axis A, as depicted by the dashed line in FIG. 15, to lock the bar 124 in the stowed position.

Figure 16:
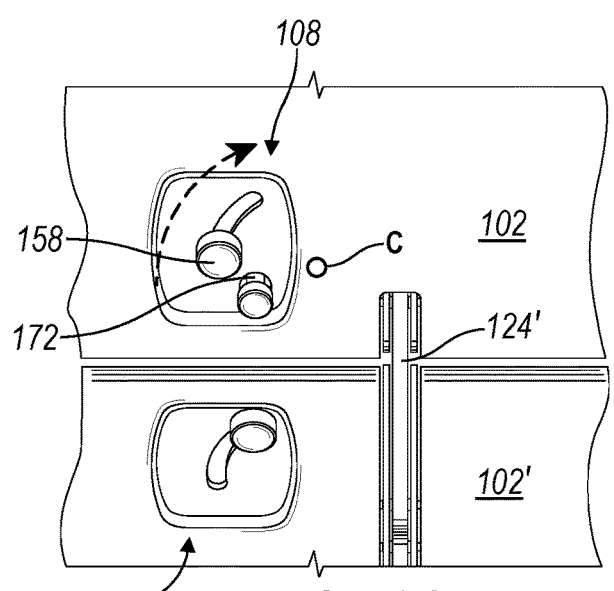
FIG. 16 illustrates adjusting the lower locking mechanism to an unlocked position according to a fourth step of the method of FIG. 13.

FIGS. 16 and 17 illustrate adjusting the lower locking mechanism 108 to the unlocked position. With reference to FIGS. 16 and 17, and referring back to FIGS. 9 and 10, a user manually translates the lock button 172 downward, as depicted by a straight dashed line. Next the user manually pivots the handle 158 clockwise about Axis C, as depicted by an arcuate dashed line, to disengage the pin 164 from the upper aperture 166' of a bar 124' of the lower speaker assembly 102' to unlock the lower locking mechanism 108. Then the user may lift the speaker assembly 102 away from the lower speaker assembly 102' as illustrated in FIG. 18.

To reattach the speaker assembly 102 to the second speaker assembly 102', a user may reverse the steps shown in FIGS. 13-18. For example, with reference to FIG. 19, first a user aligns the extended bar 124' of the lower speaker assembly 102' with the lower locking mechanism 108 of the speaker assembly 102. Then the user manually pivots the handle 158 counter-clockwise about Axis C, as depicted by an arcuate dashed line, to insert the pin 164 into the upper aperture 166' of the bar 124' of the lower speaker assembly 102'. Next the user manually translates the lock button 172 upward, as depicted by a straight dashed line, to lock the lower locking mechanism 108.

The suspension system 100 provides multiple benefits over existing systems, including, it eliminates removable quick release lock pins to connect adjacent speaker assemblies to create a concealed locking system. The locking mechanisms 106, 108 self-align, which reduces time and manual adjustment for flying and releasing speaker assemblies. The suspension system 100 also provides a simpler user interface, as compared to existing systems.

Figure 20:
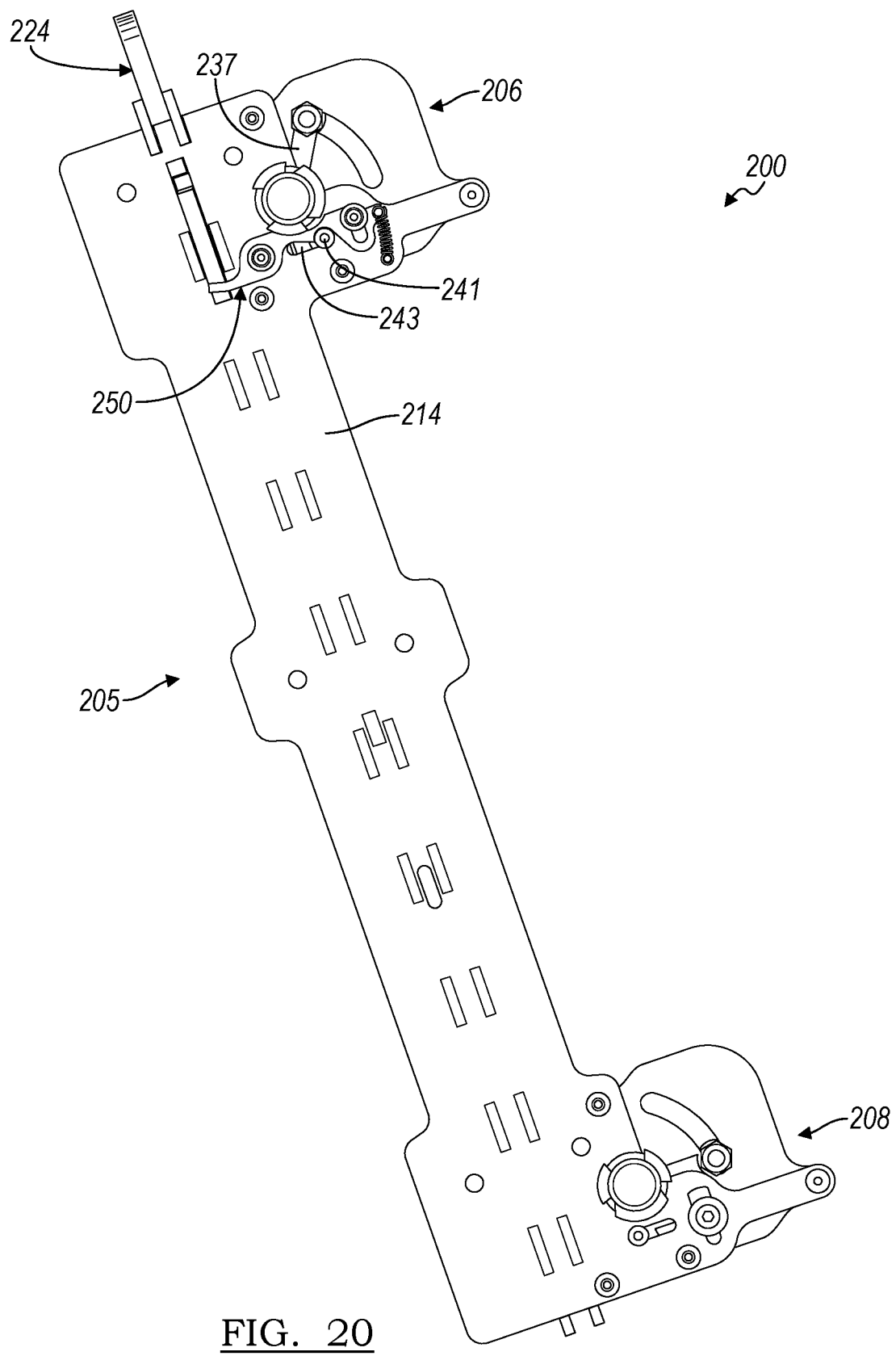
FIG. 20 is a rear perspective view of a frame of the suspension system of FIG. 1, according to another embodiment.

With reference to FIG. 20, a suspension system is illustrated in accordance with one or more embodiments and generally represented by numeral 200. The suspension system 200 is similar to the suspension system 100 and includes an additional lever 250 for securing the upper locking mechanism 206 in the unlocked position during adjustment of the bar 224. Like the suspension system 100 described with reference to FIGS. 1-19, the suspension system 200 includes a left frame 205 and a right frame (not shown) that are mounted to opposing lateral sides of a speaker cabinet 104 to connect the speaker assembly 102 to vertically adjacent speaker assemblies without removable fasteners to form a line array 110 (FIG. 1). The left frame 205 includes an upper locking mechanism 206 and a lower locking mechanism 208.

Figure 21:
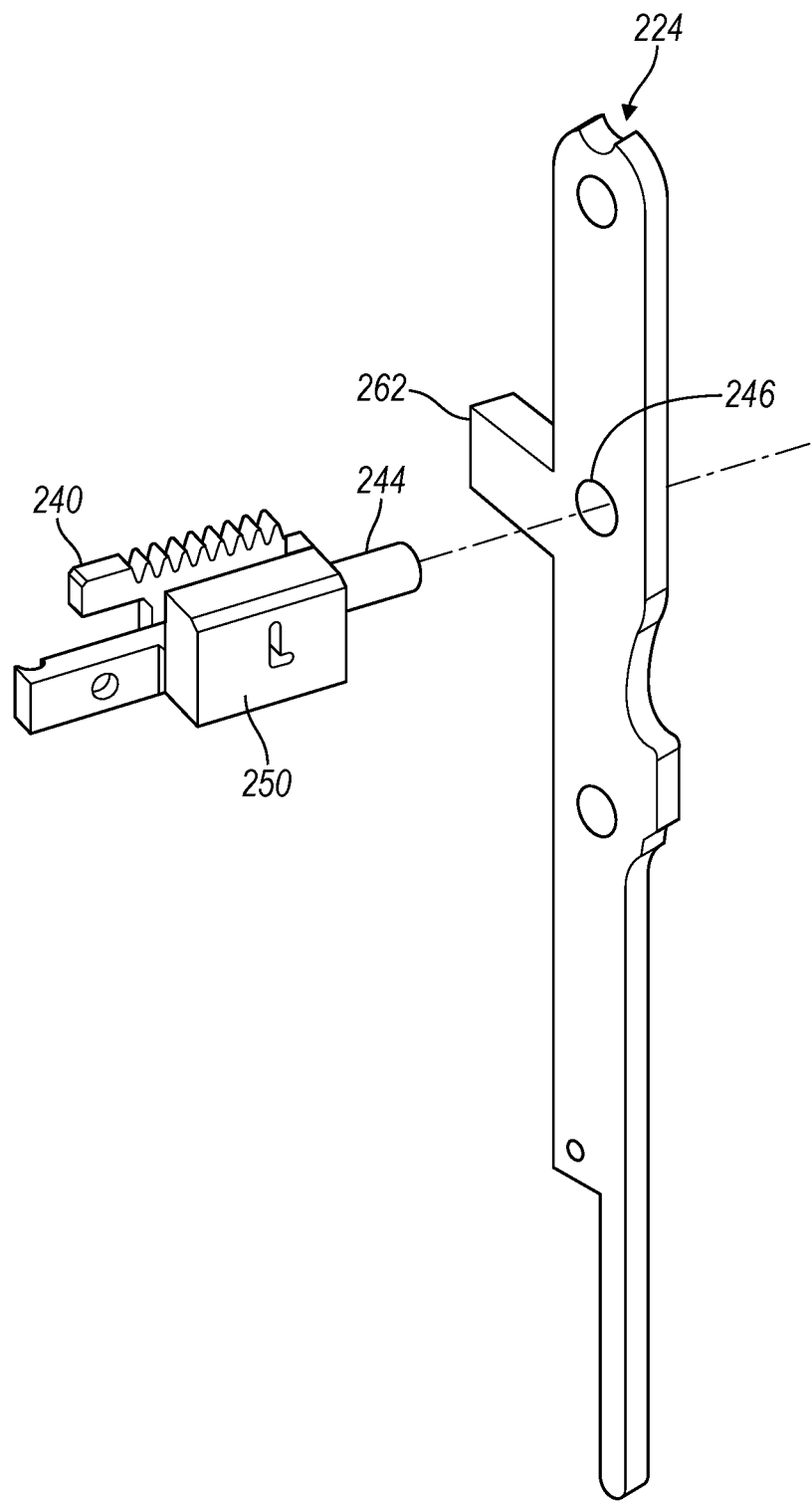
FIG. 21 is a front perspective view of a bar of the frame of FIG. 20.

Referring to FIGS. 20 and 21, like the upper locking mechanism 106, the upper locking mechanism 206 may be adjusted to lock the bar 224 in the stowed position. The upper locking mechanism 206 includes a post 241 that extends transversely from a rack 240 through a slot 243 formed through the base 214. The rack 240 is mounted for lateral translation at a distance defined by the slot 243 in response to manual adjustment of the lever arm 237. The upper locking mechanism 206 includes a pin 244 that is coupled to the rack 240 and biased to extend through a lower aperture 246 to lock the bar 224 in the stowed position. The spring biased pin 144 of the suspension system 100 of FIGS. 2-19 may contact the side of the bar 124 during adjustment between the stowed position and the extended position which may result in wear and noise, e.g., rattle.

Figure 22:
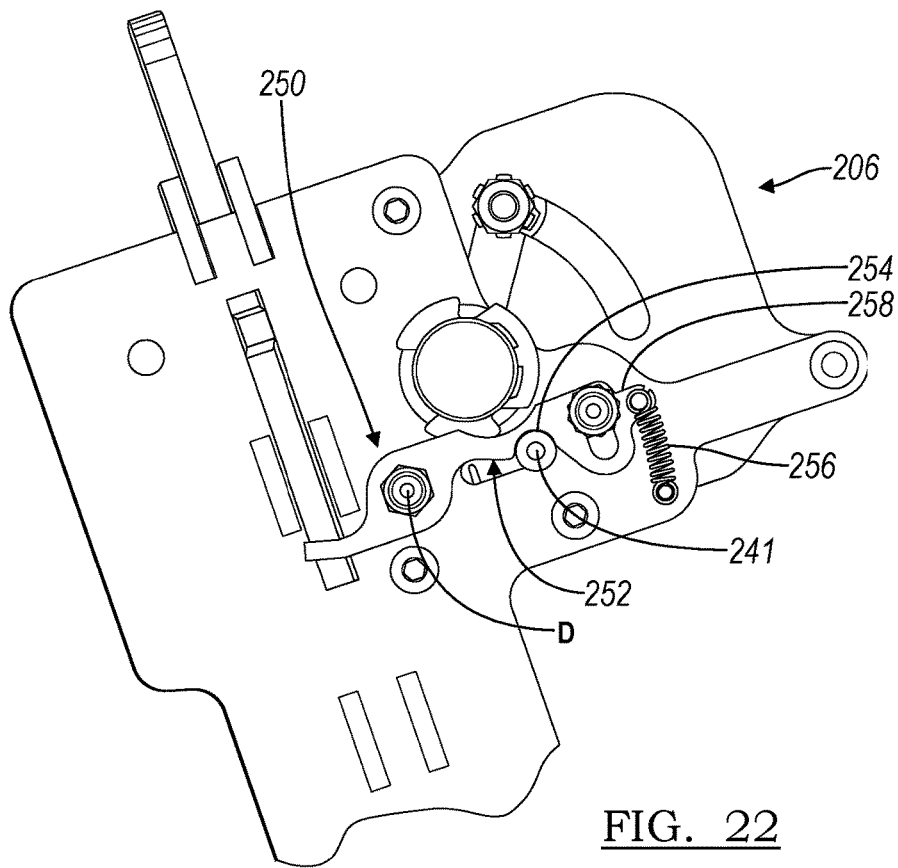
FIG. 22 is an enlarged rear view of an upper locking mechanism of the frame of FIG. 20, illustrated in an unlocked position.

With reference to FIGS. 21-22, the suspension system 200 includes a lever 250 to secure the upper locking mechanism 206 in an unlocked position. The lever 250 is mounted for pivotal motion about a shaft extending from the base 214 along Axis D. The lever 250 includes an intermediate portion 252 with a recess 254 to receive the post 241 when the rack 240 and pin 244 are translated outward and away from the bar 224, as shown in FIG. 22. The suspension system 200 includes a spring 256 that is coupled between the base 214 and a distal end 258 of the lever 250. The spring 256 biases the lever 250 downward toward the post 241 to secure the upper locking mechanism 206 in the unlocked position with the pin 244 spaced apart from the bar 224.

Figure 23:
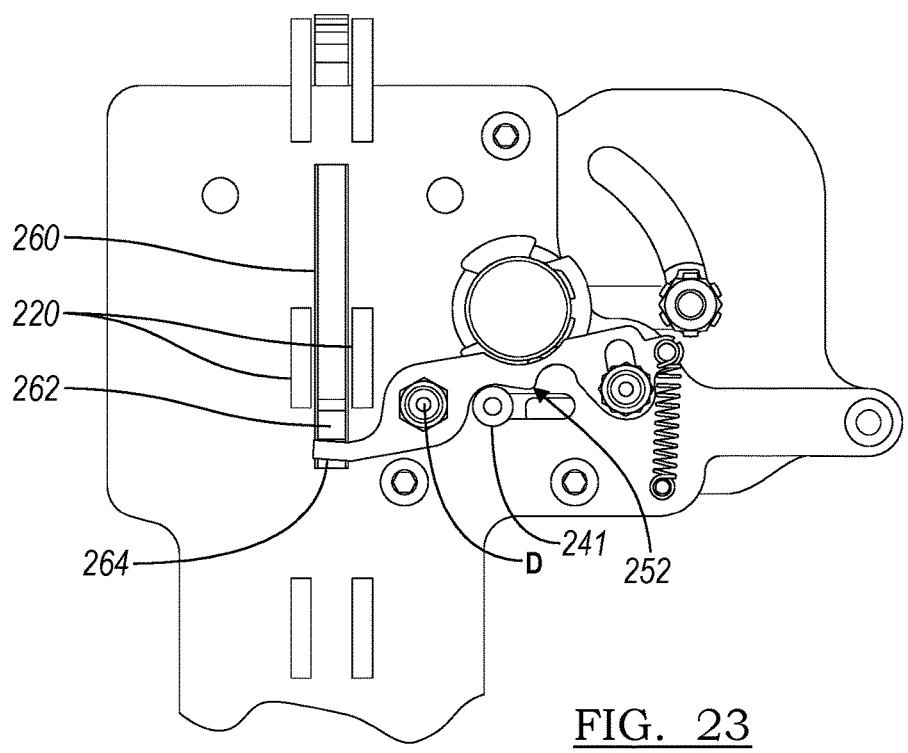
FIG. 23 is another enlarged rear view of the upper locking mechanism of the suspension system of FIG. 20, illustrated in a locked position.

Referring to FIGS. 21 and 23, the suspension system 200 automatically releases the upper locking mechanism 206 once the bar 224 is adjusted to the stowed position. The base 214 includes a longitudinal slot 260 that extends longitudinally between the slots 220. The bar 224 includes a projection 262 that extends transversely from a rearward side of the bar 224 and through the longitudinal slot 260. As shown in FIG. 23, when the bar 224 is adjusted to the stowed position, the projection 262 engages a proximal end 264 of the lever 250 to pivot the lever 250 counterclockwise about Axis D. As the lever 250 pivots, the intermediate portion 252 disengages the post 241 which releases the spring biased pin 244 to translate toward the bar 224. The projection 262 is arranged proximate to the lower aperture 246 of the bar 224 such that pin 244 releases and extends through the lower aperture 246 to lock the bar 224 in the stowed position. The lever 250 secures the upper locking mechanism 206 in the unlocked position until the lower aperture 246 of the bar 224 is aligned with the pin 244, which prevents the spring biased pin 244 from contacting the side of the bar 224 during adjustment between the stowed position and the extended position, thereby reducing wear and noise during adjustment.

While exemplary embodiments are described above, it is not intended that these embodiments describe all possible forms. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A suspension system for a speaker line array, comprising:
    a base to mount to a first speaker cabinet;
    a rail extending transversely from the base;
    a bar mounted relative to the rail between a stowed position and an extended position, wherein the bar is biased away from a central portion of the base to the extended position to contact another speaker or a support; and
    a locking mechanism driven by a transmission to lock the bar in the stowed position.

2. The suspension system of claim 1, wherein the rail comprises a pair of rails spaced apart from each other to define a channel, wherein each rail is formed with a slot extending longitudinally along an intermediate portion, and wherein the suspension system further comprises a bar pin extending transversely through the bar and received by each slot, wherein the bar is mounted for translation within the channel between the stowed position and the extended position at a distance defined by each slot length.

3. The suspension system of claim 1, wherein the locking mechanism further comprises:
    a pinion gear pivotally connected to an upper portion of the base about a pivot axis;
    a rack coupled to the base and mounted for translation in response to pivotal motion of the pinion gear;
    a pin extending from the rack to extend through a central aperture formed through the bar to lock the bar in the stowed position; and
    a spring coupled to the rack to bias the pin toward the bar.

4. The suspension system of claim 3, wherein the locking mechanism further comprises:
    a post extending transversely from the rack through a slot formed through the upper portion of the base; and
    wherein the rack is mounted for translation at a distance defined by a length of the slot.

5. The suspension system of claim 4 further comprising a lever with a proximal end, a distal end, and an intermediate portion, the intermediate portion pivotally connected to the upper portion of the base about a second pivot axis; and
    wherein the intermediate portion is formed with a recess to receive the post when the rack and pin are translated outward to secure the pin away from the bar.

6. The suspension system of claim 5 further comprising a projection extending from a rearward side of the bar and through a longitudinal slot formed through the base to engage and pivot the proximal end of the lever about the second pivot axis as the bar translates to the stowed position to release the pin to engage the bar.

7. The suspension system of claim 3 further comprising:
    a second pinion gear pivotally connected to a lower portion of the base about a second pivot axis;
    a second rack mounted for translation in response to pivotal motion of the second pinion gear; and
    a second pin extending from the second rack to extend through a distal aperture formed through a suspension system bar of a lower vertically adjacent speaker assembly.

8. The suspension system of claim 7 further comprising a lock button mounted for translation relative to the base and biased to engage the second rack to lock the second pin in engagement with the suspension system bar of the lower vertically adjacent speaker assembly.

9. The suspension system of claim 7 further comprising:
a lever arm extending radially outward from at least one of the pinion gear and the second pinion gear; and
wherein the at least one of the pinion gear and the second pinion gear is adapted to pivot in response to manual adjustment of the lever arm.

10. A speaker assembly comprising:
first and second suspension systems, each according to claim 1, to mount to a right side of the first speaker cabinet and to a left side of the first speaker cabinet.

11. A line array comprising:
first and second speaker assemblies, each according to claim 10;
wherein the bar of the first speaker assembly is biased to the extended position to engage a bracket coupled to an upper support; and
the first speaker assembly further comprising:
a second pinion gear pivotally connected to a lower portion of the base about a second pivot axis,
a second rack mounted for translation in response to pivotal motion of the second pinion gear, and
a second pin extending from the second rack to extend through a distal aperture formed through the bar of the second speaker assembly in the extended position.

12. A suspension system comprising:
a base to mount to a speaker cabinet;
a pair of rails extending transversely from the base and laterally spaced apart from each other to define a channel;
a first bar mounted within the channel between a stowed position and an extended position, wherein the first bar is biased away from a central portion of the base to the extended position;
a first pinion gear pivotally connected to an upper portion of the base about a first pivot axis;
a first rack coupled to the base and mounted for translation in response to pivotal motion of the first pinion gear; and
a first pin extending from the first rack to extend through a central aperture formed through the first bar to lock the first bar in the stowed position;
a second pinion gear pivotally connected to a lower portion of the base about a second pivot axis;
a second rack mounted for translation in response to pivotal motion of the second pinion gear; and
a second pin extending from the second rack to extend through a distal aperture formed through a suspension system bar of a lower vertically adjacent speaker.

13. The suspension system of claim 12 further comprising a lock button mounted for translation relative to the base and biased to engage the second rack to lock the second pin in engagement with the suspension system bar of the lower vertically adjacent speaker.

14. The suspension system of claim 12, wherein each rail is formed with a slot extending longitudinally along an intermediate portion, and wherein the suspension system further comprises a bar pin extending transversely through the first bar and received by each slot, wherein the first bar is mounted for translation within the channel between the stowed position and the extended position at a distance defined by a length of each slot.

15. The suspension system of claim 12 further comprising:
a spring coupled to the first rack to bias the first pin to engage the first bar in the stowed position;
a post extending transversely from the first rack through a slot formed through the upper portion of the base; and
wherein the first rack is mounted for translation at a distance defined by a length of the slot.

16. The suspension system of claim 15 further comprising:
a lever with a proximal end, a distal end, and an intermediate portion, the intermediate portion pivotally connected to the upper portion of the base about a third pivot axis;
wherein the intermediate portion is formed with a recess to receive the post when the first rack is translated outward to secure the first pin away from the first bar; and
a projection extending from a rearward side of the first bar to extend through a longitudinal slot formed through the base to engage and pivot the proximal end of the lever about the second pivot axis as the first bar translates to the stowed position to release the first pin to engage the first bar.

17. A speaker assembly comprising:
first and second suspension systems, each according to claim 12, to mount to a right side of the speaker cabinet and to a left side of the speaker cabinet.

18. A method for disassembling a line array of speaker assemblies comprising:
disconnecting a suspension system of an uppermost speaker assembly of at least two stacked speaker assemblies from an upper support;
translating a bar of the suspension system of the uppermost speaker assembly downward from an extended position to lock the bar in a stowed position;
translating a lock button of a lower locking mechanism of the uppermost speaker assembly;
pivoting a lever arm of the lower locking mechanism of the uppermost speaker assembly about a pivot axis to unlock the suspension system of the uppermost speaker assembly from the suspension system of a lower speaker assembly; and
removing the uppermost speaker assembly from the lower speaker assembly.

19. The method of claim 18, wherein pivoting the lever arm of the lower locking mechanism of the uppermost speaker assembly about the pivot axis further comprises manually pivoting a handle coupled to the lever arm about the pivot axis.

20. The method of claim 18, wherein translating the bar of the suspension system of the uppermost speaker assembly downward from the extended position further comprises contacting a lever to release a spring biased pin to engage and lock the suspension system of the uppermost speaker assembly in the stowed position without a removable fastener.

* * * * *